United States Patent
Auchmoody et al.

(10) Patent No.: US 8,621,240 B1
(45) Date of Patent: Dec. 31, 2013

(54) USER-SPECIFIC HASH AUTHENTICATION

(75) Inventors: Scott C. Auchmoody, Irvine, CA (US); Scott Ogata, Lake Forest, CA (US); Greg H. Moulton, Irvine, CA (US)

(73) Assignee: EMC Corporation, Hopkinton, MA (US)

( * ) Notice: Subject to any disclaimer, the term of this patent is extended or adjusted under 35 U.S.C. 154(b) by 1105 days.

(21) Appl. No.: 11/968,045

(22) Filed: Dec. 31, 2007

(51) Int. Cl.
*E21B 15/04* (2006.01)

(52) U.S. Cl.
USPC ............. 713/193; 713/22; 713/150; 713/165; 713/171; 713/189; 707/204; 707/640

(58) Field of Classification Search
USPC ........... 713/171, 179, 189, 193, 22, 150, 165; 707/204, 640
See application file for complete search history.

(56) References Cited

U.S. PATENT DOCUMENTS

| | | | |
|---|---|---|---|
| 7,890,746 B2 * | 2/2011 | Desai et al. .................... | 713/150 |
| 8,099,605 B1 * | 1/2012 | Billsrom et al. ............... | 713/187 |
| 2002/0152393 A1 * | 10/2002 | Thoma et al. ................. | 713/189 |
| 2004/0143745 A1 * | 7/2004 | Margolus et al. ............. | 713/176 |
| 2004/0255140 A1 * | 12/2004 | Margolus et al. ............. | 713/193 |
| 2005/0055552 A1 * | 3/2005 | Shigeeda ....................... | 713/171 |
| 2005/0175201 A1 * | 8/2005 | Herman ......................... | 381/312 |
| 2007/0203957 A1 * | 8/2007 | Desai et al. ................... | 707/204 |
| 2009/0075630 A1 * | 3/2009 | McLean ........................ | 455/411 |
| 2010/0083004 A1 * | 4/2010 | Kirshenbaum ............... | 713/193 |
| 2010/0098256 A1 * | 4/2010 | Kirshenbaum ............... | 380/277 |
| 2010/0185855 A1 * | 7/2010 | Margolus et al. ............. | 713/165 |
| 2012/0204024 A1 * | 8/2012 | Augenstein et al. .......... | 713/150 |
| 2013/0166510 A1 * | 6/2013 | Augenstein et al. .......... | 707/640 |

* cited by examiner

*Primary Examiner* — Thu Ha Nguyen
(74) *Attorney, Agent, or Firm* — Workman Nydegger (57) ABSTRACT

Backup data in a single-instance storage device is accessed through a backup server using hashes representative of and pointing to the backup data. To prevent unauthorized access, the server provides each client with encrypted versions of hashes corresponding to data backed up by the client. The hashes can be encrypted using client-specific symmetric encryption keys known to the server. To request data, a client provides the backup server with a corresponding encrypted hash. The backup server decrypts the encrypted hash using the client's encryption key. The original hash is only obtained if the key used for decryption is identical to the key used for encryption. Consequently, if an encrypted hash is stolen or otherwise acquired by a client different from the client that backed up the corresponding data, it cannot be used by the different client to request the corresponding data from the backup server.

20 Claims, 7 Drawing Sheets

Table 620 (FIG. 6C)

| 622 | 624 | 626 | | | |
|---|---|---|---|---|---|
| | | $R_1$ | $R_2$ | $\cdots$ | $R_N$ |
| $H\binom{\text{Full Path 1 +}}{\text{Metadata 1}}$ | $E(h_{F1}, C_K)$ | 1 | 0 | $\cdots$ | 1 |
| $H\binom{\text{Full Path 2 +}}{\text{Metadata 2}}$ | $E(h_{F2}, C_K)$ | 0 | 1 | $\cdots$ | 0 |
| $\vdots$ | $\vdots$ | $\vdots$ | $\vdots$ | $\vdots$ | $\vdots$ |
| $H\binom{\text{Full Path Y +}}{\text{Metadata Y}}$ | $E(h_{FY}, C_K)$ | 1 | 1 | $\cdots$ | 1 |

*FIG. 6C*

Table 630 (FIG. 6D)

| 632 | 634 | 636 | | | |
|---|---|---|---|---|---|
| | | $R_1$ | $R_2$ | $\cdots$ | $R_N$ |
| $H(h_1 + LC_K)$ | $E(h_1, C_K)$ | 1 | 1 | $\cdots$ | 1 |
| $H(h_2 + LC_K)$ | $E(h_2, C_K)$ | 0 | 1 | $\cdots$ | 1 |
| $\vdots$ | $\vdots$ | $\vdots$ | $\vdots$ | $\vdots$ | $\vdots$ |
| $H(h_X + LC_K)$ | $E(h_X, C_K)$ | 1 | 1 | $\cdots$ | 0 |

*FIG. 6D*

USER-SPECIFIC HASH AUTHENTICATION

CROSS-REFERENCE TO RELATED APPLICATIONS

Not Applicable.

BACKGROUND OF THE INVENTION

1. The Field of the Invention

The present invention relates to data storage and backup solutions for archiving data. More particularly, embodiments of the invention relate to software, hardware, systems, and methods for restricting user access to single-instance storage through user-specific hash authentication.

2. The Relevant Technology

The need for reliable backup and archiving of information is well known. Businesses are devoting large amounts of time and money toward information system (IS) resources that are devoted to providing backup and archive of information resident in computers and servers within their organizations that produce and rely upon digital information. The customers of the data storage industry are more frequently demanding that not only is their data properly backed up but also that such data protection be done in a cost effective manner with a reduced cost per bit for stored data sets.

To address these demands, Content Addressed Storage (CAS) has been developed to provide a more cost effective approach to data backup and archiving. Generally, CAS applications involve a storage technique for content that is in its final form, i.e., fixed content, or that is not changed frequently. CAS assigns an identifier to the data so that it can be accessed no matter where it is located. For example, a hash value may be assigned to each portion or subset of a data set that is to be data protected or backed up. Presently, CAS applications are provided in distributed or networked storage systems designed for CAS, and storage applications use CAS programming interface (API) or the like to store and locate CAS-based files in the distributed system or network.

The usage of CAS enables data protection systems to store, online, multi-year archives of backup data by removing storage of redundant data because complete copies of data sets do not have to be stored as long as that content is stored and available. The use of CAS removes the challenges of maintaining a centralized backup index and also provides a high level of data integrity. CAS-based backup and archive applications have also improved the usage network and data storage resources with better distribution of data throughout a multi-node data storage system.

CAS-based backup and archive applications are also desirable because multi-year or other large backup archives can be stored easily since only a single instance of any particular data object (i.e., content) is stored regardless of how many times the object or content is discovered with the data set being protected or backed up. With CAS, the storage address for any data element or content is generated by an analysis of the contents of the data set itself. Since an exclusive storage address is generated for each unique data element (which is matched with a unique identifier) and the storage address points to the location for the data element, CAS-based architectures have found favor in the storage industry because they reduce the volume of data stored as each unique data object is stored only once within the data storage system.

While providing higher efficiency data storage, current CAS-based data storage systems are often susceptible to unauthorized data access. This can be a significant problem, for example, for an entity or organization that handles and backs up confidential, sensitive, and other data for which intra-organization restricted access is desired. In this scenario, access control lists and/or other means are often implemented to allow only certain users to access the data on production servers implementing conventional storage techniques. However, when data is backed up to a CAS system, it is converted to a hash file system format for which conventional access control means are ineffective.

In particular, because CAS uses hash values or other unique identifiers to access data, a user can access the data a hash value is assigned to by using the hash value to request the data from the CAS system. On the one hand, this permits users to locally store hash values corresponding to data backed up by the users and request backed up data at any time using a locally stored hash value. However, this also permits malicious users to access data they have not backed up and that they may be unauthorized to access if they can obtain the corresponding hash values first. For instance, a first user restricted from accessing sensitive data on a production server could nevertheless access a version of the sensitive data backed up by a second user by hacking the second user's computer and obtaining hash values corresponding to the sensitive data.

The subject matter claimed herein is not limited to embodiments that solve any disadvantages or that operate only in environments such as those described above. Rather, this background is only provided to illustrate one example technology area where some embodiments described herein may be practiced.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Embodiments of the invention relate to methods and systems for limiting user access to backup data stored in content-addressed storage and accessed using a hash file system. According to one embodiment, data is hashed to obtain deterministic and probabilistically unique hash values, and the hash values can then be used to point to and/or address the data. Advantageously in a CAS system, only a single instance of backup data is stored. This can significantly reduce the storage requirements of backup and archive systems.

Briefly, embodiments of the invention involve a backup server storing user- or client-specific encryption/decryption keys (also referred to as "cryptographic keys") for a plurality of users or client computer systems. The cryptographic keys are known only to the backup server and are not provided to the client computer systems. As will be explained, the use of client-specific cryptographic keys prevents clients from requesting data they have not backed up to the backup server.

According to one embodiment, when a client generates a backup of client data, the client hashes files and/or pieces of data to obtain hash values that can be used to identify and eliminate redundant data from the backup. In the process of identifying and eliminating redundant data, the client may provide the generated hash values to the backup server. The backup server encrypts the hash values using a cryptographic key specific to the client and returns encrypted hash values to the client that the client stores for future use in communicating with the backup server regarding the underlying data.

For instance, the client can request data from the backup server using a corresponding encrypted hash value. The backup server receives the encrypted hash value and decrypts it with the aforementioned cryptographic key (or a complementary cryptographic key) that is specific to the client. The decryption generates the original hash value that was not only used to identify and eliminate redundant data but that also points to the underlying data in the CAS system. The backup server can then retrieve and provide the desired data to the requesting client from the CAS system.

Advantageously, this prevents clients from using another client's encrypted hash values to request data they have not backed up. For instance, a user on a second client computer could copy, from a first client computer, an encrypted hash value corresponding to data backed up by the first client computer. According to this embodiment, the encrypted hash value is previously encrypted by the backup server using a cryptographic key specific to the first client computer. To retrieve the underlying data, the encrypted hash value has to be decrypted by the backup server using the cryptographic key specific to the first client computer. However, if the request for the underlying data comes from the second client computer, the backup server may attempt to decrypt the encrypted hash value using the wrong cryptographic key (e.g., a key specific to the second client computer), but the result will obviously not be the hash value pointing to the underlying data and the second client computer will be unable to access the underlying data.

To practice the invention, the client, backup server, and storage may be any devices useful for providing the described functions, including data processing and storage and communication devices and systems such as computer devices typically used as hosts in user systems with processing, memory, and input/output components, and server devices configured to maintain and then transmit digital data over a communications network. Data typically is communicated in digital format following standard communication and transfer protocols. The data storage resources are generally described as disk, optical, and tape devices that implement RAID and other storage techniques and that may use SCSI and other I/O, data transfer, and storage protocols, but the invention is not intended to be limited to the example embodiments or to specific hardware and storage mechanisms as it is useful for nearly any data storage arrangement in which backups of digital data are generated and maintained.

Figure 1:
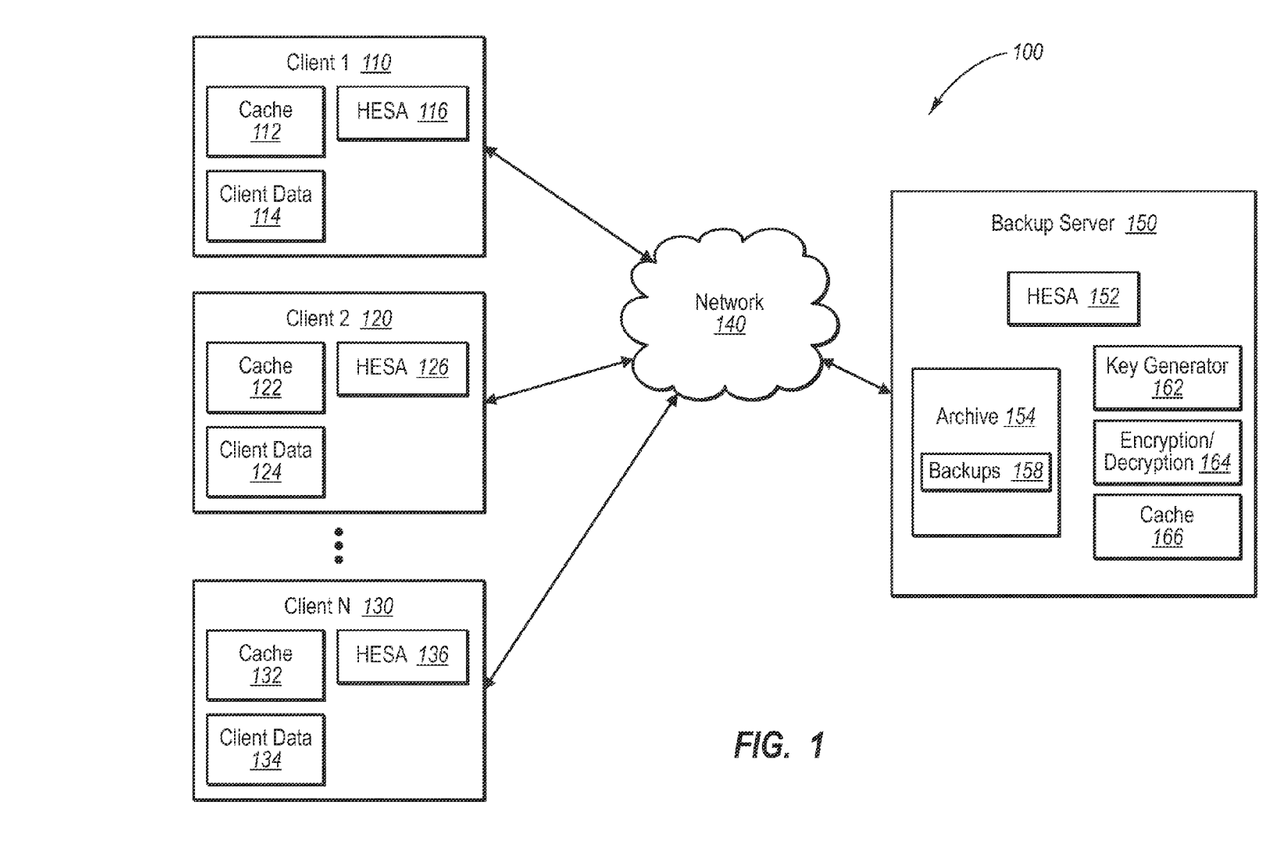
FIG. 1 illustrates an example operating environment in which embodiments of the invention can be implemented.

With reference now to FIG. 1, a data storage (or data protection) system 100 is illustrated which implements aspects of the invention. The system 100 is shown in simplified or example form and is intended to represent a distributed network of computer systems/devices that generate digital data that is protected with copies stored in an archive or backup file system (such as a disk, tape, or other archival solution). The backup or data protection is managed by a backup server 150 that may be provided remotely as shown and/or be provided all or in part as part of a client system (e.g., client systems 110, 120, 130 may include an instance of a storage application). The backup server 150 may also be referred to as a data storage management system, hash file system ("HFS") server, or content addressed storage ("CAS") server.

As shown, the system 100 includes a plurality of client systems or nodes 110, 120, 130. The client systems 110, 120, 130 may be, for instance, desktops, laptops, file servers, and the like, that communicate with and backup data to the backup server 150. Each client system 110, 120, 130 may include memory for storing one or more caches 112, 122, 132, respectively. While the system 100 is illustrated with three client systems labeled client 1, client 2, and client N, it is appreciated that the system 100 may have as few as two client systems and up to N client systems, N being any number desired and supported by the system 100.

The client systems 110, 120, 130 can link to the backup server 150 via communications network 140 (e.g., a LAN, a WAN, the Internet, or other wired and/or wireless digital communications networks). Each of the client systems 110, 120, 130 may store client data 114, 124, 134 generated or accessed by the corresponding client system.

In the embodiment of FIG. 1, the client data 114, 124, 134 is managed for data protection by a high efficiency storage application 116, 126, 136 on each of the client systems 110, 120, 130. Generally, such data protection involves the high efficiency storage applications 116, 126, 136 generating backups for storage in the archive 154. The archive 154 may take many forms such as disk storage, holographic systems, tape storage, other memory mechanisms, and combinations of such mechanisms that are useful for archiving large amounts of digital information. Further, the archive 154 may be integrated with the HFS server 150 as shown and/or may be in a remote location. In the present embodiment, the archive 154 comprises a CAS system.

In one embodiment of the invention, the storage applications 116, 126, 136 are high efficiency storage applications that control the size of the generated backups 158 such as by de-duplicating backups prior to sending them over the network 140 to the backup server 150. Various embodiments of data de-duplicating storage applications and related methods are disclosed in U.S. Pat. No. 6,704,730 (the '730 patent) and U.S. Pat. No. 6,810,398 (the '398 patent), both of which are incorporated by reference in their entirety.

Alternately or additionally, the backups generated at each of the client systems 110, 120, 130 may be transmitted to the backup server 150 prior to being data de-duplicated. In this case, the backup server 150 may include a high efficiency storage application 152, similar to the storage applications 116, 126, 136 described above, for de-duplicating the backups stored in the archive 154.

Typically, each of the backups 158 represents a secondary copy of the production client data 114, 124, 134 as of a particular point in time. For instance, each storage application 116, 126, 136 may generate backups at different times, such as hourly, daily, weekly, and the like or any combination thereof. Additionally, the size of a backup can be minimized, thereby conserving network resources, by including only new/changed data in the backup.

The backup server 150 may include a key generator 162 for generating client-specific cryptographic keys. Alternately or additionally, client-specific cryptographic keys can be obtained from a source external to the backup server 150. Once a client-specific cryptographic key is generated for a client, it can be stored for future use on hash values received from the client. In one embodiment implementing symmetric key cryptography, the key generator 162 generates a single cryptographic key (used for both encryption and decryption) per client. Alternately or additionally, the key generator 162 can generate two cryptographic keys per client (e.g., one key for encryption and a complementary key for decryption) when asymmetric key cryptography is implemented.

The backup server 150 may further include an encryption/decryption module 164. As will be explained more fully below, at times the clients 110, 120, 130 may send the backup server 150 unencrypted and/or encrypted hash values. When a received hash value is unencrypted, the encryption/decryption module 164 may use a corresponding client-specific key to encrypt the hash value, returning the encrypted hash value to the client for future reference. When a received hash value is already encrypted, the encryption/decryption module 164 can use the corresponding client-specific key to decrypt the hash value, and the decrypted hash value can be used by the backup server 150 to retrieve a specific file or data from the archive 154. The encryption/decryption algorithm implemented by the encryption/decryption module 164 may comprise an asymmetric key cipher or a symmetric key cipher (including a block or stream cipher).

Additionally, the backup server 150 may include one or more caches 166 for storing hash values representative of backup data in the CAS system 154.

Figure 2:
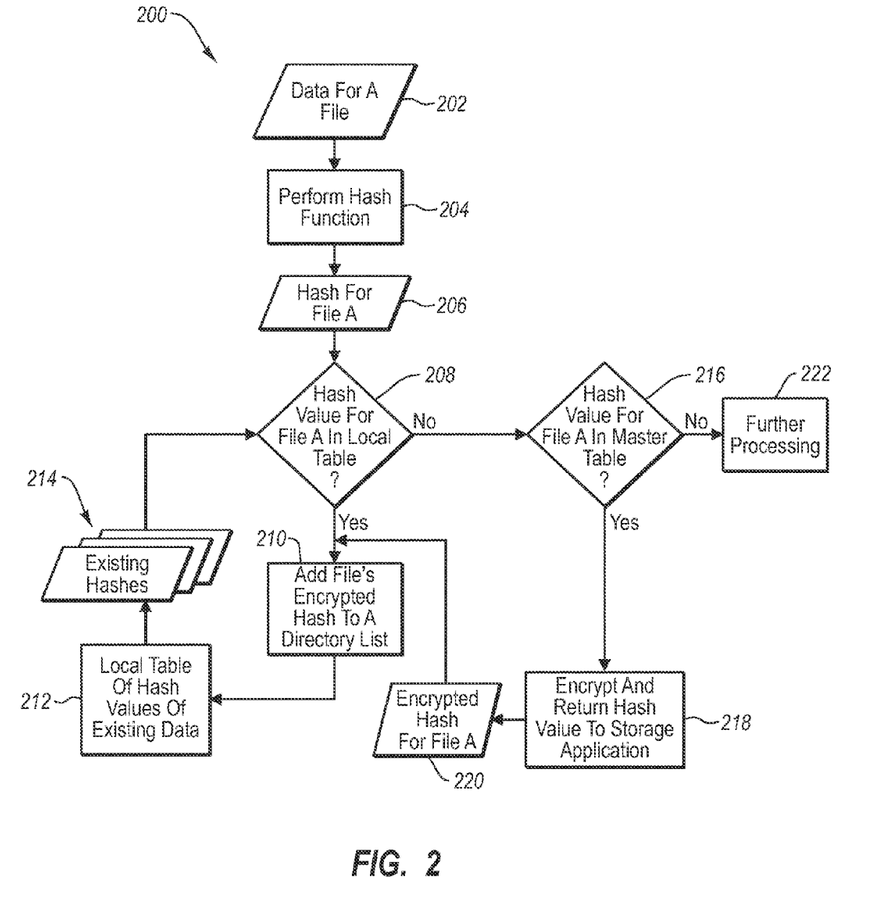
FIG. 2 is a logic flow chart depicting steps in the entry of a computer file into a hash file system.

As mentioned above, de-duplicated backups can be stored by the backup server using CAS 154 and a hash file system. FIG. 2 is a logic flow chart depicting a process 200 for entry of a computer file or other digital sequence or other data into the hash file system implemented according to embodiments of the invention. The process 200 can be performed by a storage application on a client system or on a backup server. For purposes of the present example, the storage application 116 will perform the process 200, in which case the computer file discussed in this example may correspond to some or all of the client data 114 on the client system 110.

The process 200 begins with a storage application performing 204 a hash function on File A 202 to obtain a hash value (also referred to as a "hash") 206 of File A. Alternately or additionally, the storage application may perform a hash function on data associated with File A, including the full path of File A, metadata of File A, and the like or any combination thereof. The resulting hash value 206 is compared 208 to the contents of a local table 212 containing hash values. The local table 212 additionally includes encrypted versions of the hash values obtained previously from the backup server 150. The local table 212 may be implemented, for instance, using a filename cache, as described more fully below with respect to FIGS. 6A-6C. The contents of the local table 212 comprising hash values is provided in the form of existing hash values 214 for the comparison operation of decision step 208.

If the hash value 206 of File A is already in the local table 212, then the file's encrypted hash value can be added 210 to the hash recipe. This hash recipe includes, in one embodiment, the data and associated structures needed to reconstruct a file, directory, volume, or entire system depending on the class of computer file data entered into the system.

On the other hand, if the hash value 206 for File A is not currently in the local hash table 212, this may be indicative that File A has not previously been entered into the hash file system by storage application 116 (or that the local hash table 212 no longer has a record of File A). Thus, the storage application 116 queries the backup server 150 to determine 216 if the file has previously been entered into the hash file system by a different storage application (or by the storage application 116 where the local hash table 212 no longer includes the hash value for File A). This query may be referred to hereinafter as an "is_present" query.

The backup server maintains a master hash table (that can be loaded in the cache 166 of FIG. 1) that may include hash values for files entered into the hash file system by all of the client systems 110, 120, 130. If the hash value of File A is in the master hash table, the backup server can respond to the is_present query in the affirmative. In this case, the backup server further encrypts 218 the hash value with an encryption key specific to the client 110 and provides the encrypted hash value 220 to the storage application. The storage application can then add 210 the file's encrypted hash value to the hash recipe and to the local hash table.

If the backup server determines at step 216 that the hash value for File A is not in the master hash table (indicating that File A has not been entered into the hash file system previously), the backup server responds to the is_present query in the negative and the storage application processes 222 the file further as described below, which may include breaking the file into pieces and individually entering the pieces into the hash file system.

Figure 3:
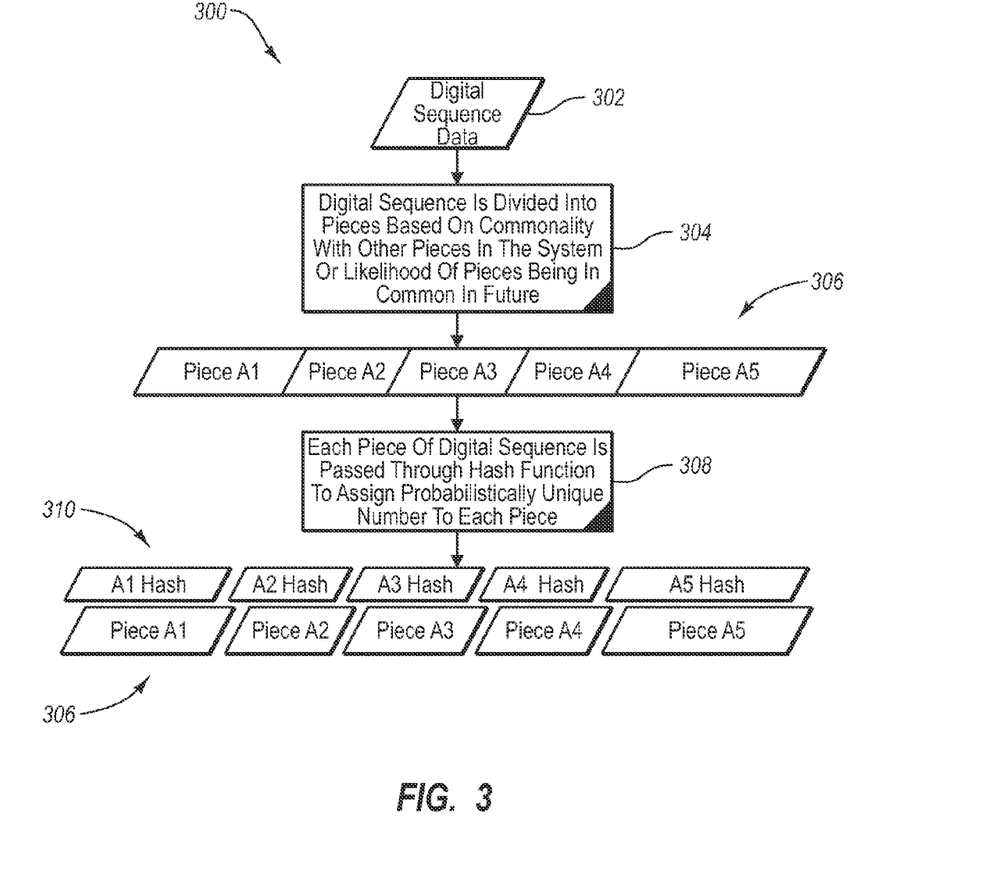
FIG. 3 is a further logic flow chart depicting steps in the breakup of a file or other digital sequence into hashed pieces.

With reference additionally now to FIG. 3, a further logic flow chart is provided depicting the steps in a process 300 for breakup of a computer file or digital sequence into hashed pieces. This process ultimately results in the production of a number of data pieces as well as corresponding probabilistically unique hash values for each piece. In the present embodiment, the process 300 may be performed by the storage application 116 to File A upon determining that File A has not previously been entered into the hash file system (e.g., after determining that the hash value of File A is not present in the local hash table or the master hash table).

The file data 302 is divided 304 into blocks or pieces (also referred to as "chunks," "atomics" or the like) based on commonality with other pieces in the system 100 or the likelihood of pieces being found to be in common in the future. In one embodiment, the storage application 116 divides 304 the file into pieces using the "sticky byte" algorithm, disclosed in the '730 patent referenced above. The result of step 304, in the representative example shown, is the production of five file pieces 306 denominated A1 through A5 inclusively. Each of the file pieces 306 is individually hashed 308 to assign a probabilistically unique number to each of the pieces 306. Thus, as shown, each of the file pieces 306 has an associated, probabilistically unique hash value 310 (shown as A1 Hash through A5 hash, respectively).

Alternately, the file 302 or other digital sequence can be broken up into pieces using one or more algorithms other than the one described above. In this case, the digital sequence can be broken into pieces or blocks of data of a fixed or variable size.

Figure 4:
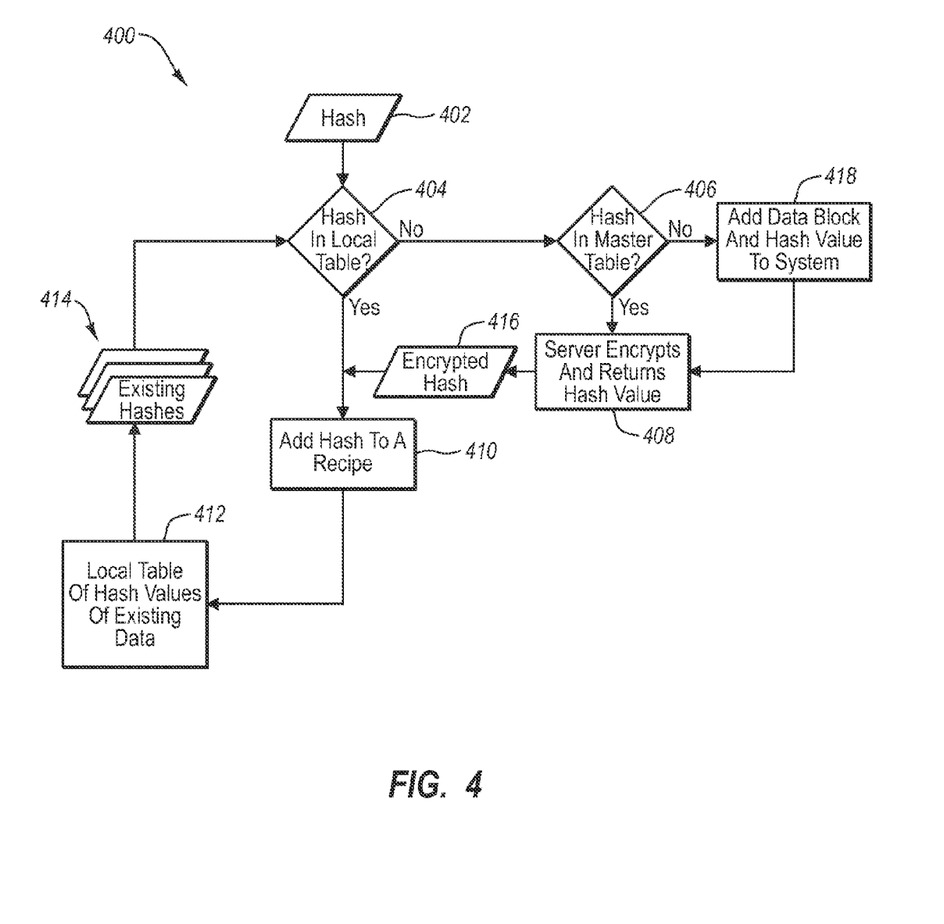
FIG. 4 is another logic flow chart depicting steps in the entry of a chunk or atomic of data into a hash file system.

With additional reference to FIG. 4, another logic flow chart is shown depicting a method 400 of entering the blocks of a previously un-entered file or digital sequence into the hash file system. The method 400 uses a hash value 402 of a block or piece of data to determine whether the block or piece of data has been previously stored on the backup server 150. The hash value 402 may correspond to one of the hash values 310 of FIG. 3. The storage application 116 compares the hash value 402 to the contents of the local table 412 containing hash values of previously entered data blocks. Alternately or additionally, the local table may include hash values obtained by hashing a combination of a client-side generated unique key with hash values of previously entered data blocks. In this latter case, the storage application 116 may combine the hash value 402 with the client-side generated unique key and hash the result for use in the comparison step 404. Similar to FIG. 2 above, the local table 412 may be implemented, for instance, using a hash cache, as described more fully below with respect to FIGS. 6A-6D.

If the hash value 402 of the piece of data is already in the local table 412, the hash value is added 410 to a hash recipe, and the piece of data need not be transmitted to the backup server for storage since the presence of the hash value in the local table indicates that the piece of data has previously been entered into the hash file system and stored on the backup server 150. If the hash value 402 is not in the local table 412, the storage application performs an is_present query to the backup server to determine 406 whether the piece of data has previously been entered into the hash file system and stored on the backup server (e.g., by another storage application or by the storage application 116)

At determination step 406, the backup server may compare the hash value 402 to a master table of hash values (that may be loaded in the cache 166 of FIG. 1) corresponding to data blocks stored in the CAS archive 154. If the hash value 402 is in the master hash table, the backup server responds to the is_present query in the affirmative and further encrypts 408 the hash value with the client-specific encryption key, returning the encrypted hash value 416 to the storage application 116 of the client 110. The storage application can then add 410 one or more of the hash value 402 or the encrypted hash value 416, to the hash recipe and to the local hash table.

If the backup server 150 determines at step 406 that the hash value 402 for the data block is not in the master hash table (indicating that data block has not been entered into the hash file system previously), the backup server responds to the is_present query in the negative. In this case, the storage application may forward the data block and hash value to the backup server for storage, as shown at step 418, after which the backup server may encrypt 408 the hash value 402 and return the encrypted hash value 416 to the storage application 116.

Figure 5:
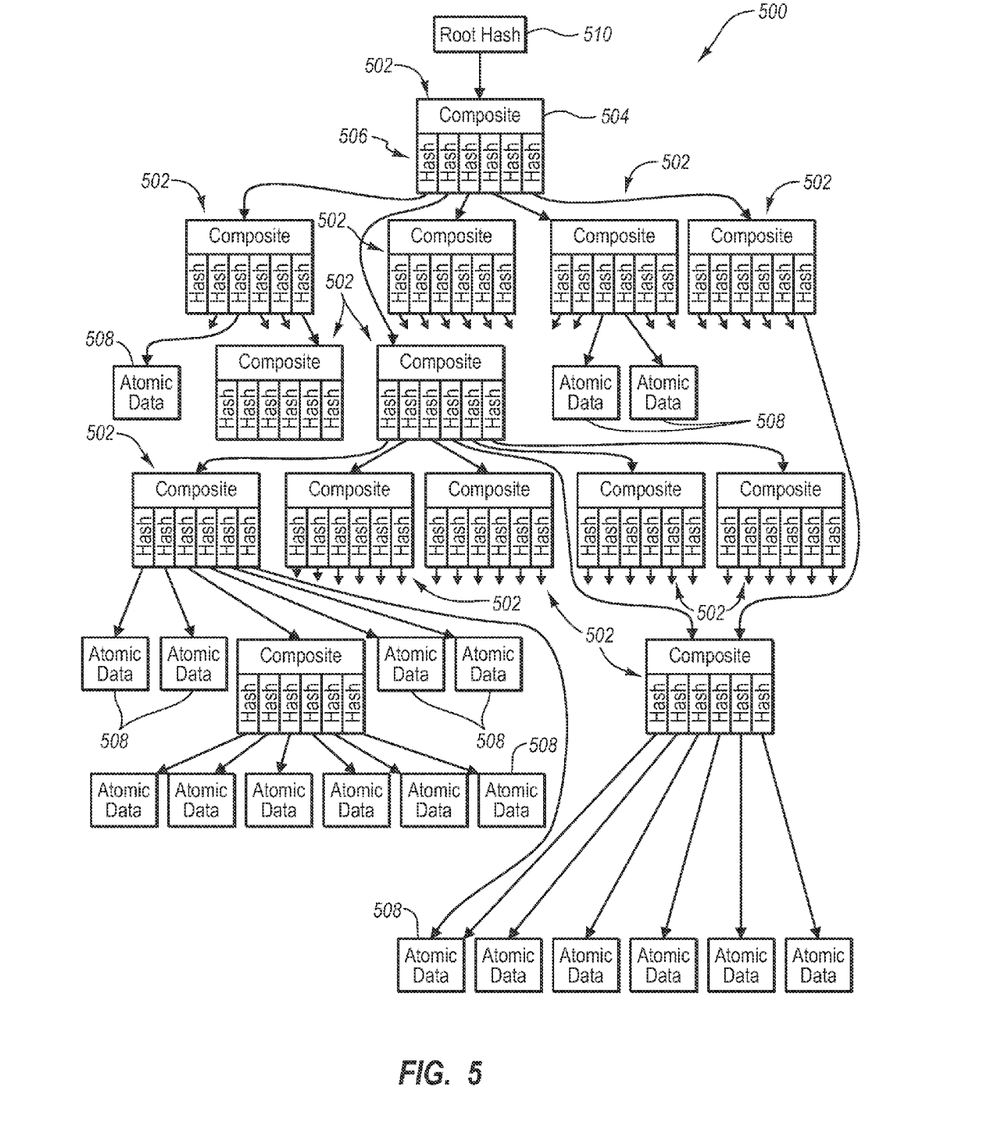
FIG. 5 depicts a conceptual representation of a hash file system according to embodiments of the invention.

With reference additionally now to FIG. 5, a conceptual representation 500 is shown of how a hash file system and method may be utilized to organize data 502 to optimize the reutilization of redundant sequences through the use of hash values 506 as pointers to the data they represent and wherein data 502 may be represented either as explicit byte sequences (atomic data) 508 or as groups of sequences (composites) 504.

The representation 500 illustrates the tremendous commonality of recipes and data that gets reused at every level. The basic structure of the hash file system of the present embodiment is essentially that of a "tree" or "bush" wherein the hash values 506 are used instead of conventional pointers. The structure 500 uses hash values 506 in recipes to point to data or another hash value that could also itself be a recipe. In essence, then, recipes can point to other recipes that point to still other recipes that ultimately point to some specific data, eventually getting down to nothing but data.

In the present embodiment, the representation 500 may correspond to a backup of data on one of the clients 110, 120, 130 of FIG. 1. At the topmost level of the tree of FIG. 5, a hash can be performed to generate a root hash 510. Because the hashes performed at each level of the tree result in the production of probabilistically unique hash values for each corresponding piece of data or composite upon which the hash is performed, the existence of the root hash 510 implicates the existence of all the data and composites beneath the root hash.

The representation 500 illustrates the susceptibility of the hash file system to malicious use. In particular, assuming the representation 500 corresponds to a backup of client data 114 on the client 110, the client 110 may store one or more of the hash values of the tree structure 500 in the cache 112. A malicious user could obtain the hash values by hacking the client 110. The malicious user would then be able to access the entire backup by requesting all of the data corresponding to the root hash 510 from the backup server. Alternately or additionally, the malicious user could request data corresponding to one or more of the intermediate hash values from the backup server.

To overcome this problem, the backup server provides encrypted hash values to the clients 110, 120, 130, which the clients can store and use later in communications with the backup server regarding the underlying data. The encrypted hash values can be used in a variety of communications between the clients and the backup server, as described below:

is_present

The is_present query, described above, typically occurs after the client determines that a hash value is not present in the local hash table of the client. The client sends the hash value to the backup server, querying whether the backup server already has the hash value. The backup server may compare the hash value to hash values in the master hash table and respond to the query, indicating whether the backup server already has the hash value in the master hash table. The backup server further encrypts the hash value using a client-specific encryption key and returns the encrypted hash value to the client.

add_hash_data

The add_hash_data request may occur after determining that a hash value is not present in the master hash table of the backup server (e.g., at step 418 of FIG. 4). In this case, the client sends the data and the hash of the data to the backup server. The backup server may store the data, add the hash value to the master hash table, encrypt the hash value using the client-specific encryption key, and return the encrypted hash value to the client.

get_hash_data

The get_hash_data request is used by a client to retrieve data corresponding to a particular hash. For instance, a client can use a get_hash_data request to restore data that has been lost, corrupted, or the like. In this case, the client sends to the backup server an encrypted hash value corresponding to data the client desires to retrieve from the backup server. The backup server uses the client-specific decryption key (which may be the same as the encryption key in some cases) to decrypt the encrypted hash value and obtain a decrypted hash value. The backup server can then use the decrypted hash value to retrieve the desired data from the CAS system 154 and return it to the client.

get_backup

The get_backup request is used by a client to retrieve a particular backup performed on a particular date. In this example, the client provides the date to the backup server and the backup server returns an encrypted root hash for the backup having the particular date. Using the encrypted root hash, the client can then request the corresponding data from the backup server, as described above with respect to the get_hash_data request.

is_present_encrypted

The is_present_encrypted query can be used by the client to query whether data corresponding to a previously obtained encrypted hash value has been entered into and remains on the backup server. According to this embodiment, the backup server 150 may age data out of the CAS system according to a data retention plan. Thus, although the backup server may have previously entered data into the CAS system and returned an encrypted hash value to the client, the backup server may subsequently age the corresponding data out of the system.

When a client is entering data into a backup for which an encrypted hash value is found in the local hash table, the client may send the encrypted hash value to the backup server to query whether the data currently resides in the CAS system. The backup server may use the client-specific decryption key to decrypt the encrypted hash value and then determine whether the decrypted hash value is found in the master hash table of the backup server. Once this determination is made, the backup server responds to the client's is_present_encrypted query.

Figure 6A:
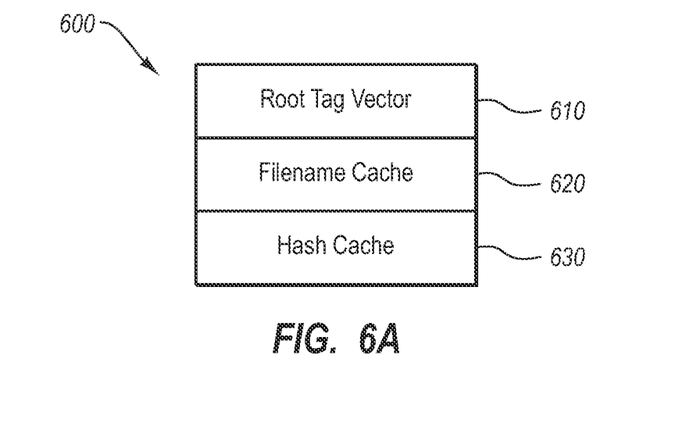
FIGS. 6A-6D illustrates aspects of a cache that can be used in embodiments of the invention for the entry of files and data into a hash file system.

As already mentioned above, each client 110, 120, 130 may locally store hash values and/or other data in cache memory 112, 122, 132. FIG. 6A illustrates one embodiment of a cache 600 that may correspond to any of the caches 112, 122, 132 of FIG. 1. As illustrated in FIG. 6A, the cache 600 includes a root tag vector 610, a filename cache 620, and a hash cache 630. The filename cache 620 may include the local table 212 of FIG. 2 and/or the hash cache 630 may include the local table 412 of FIG. 4.

Figure 6B:
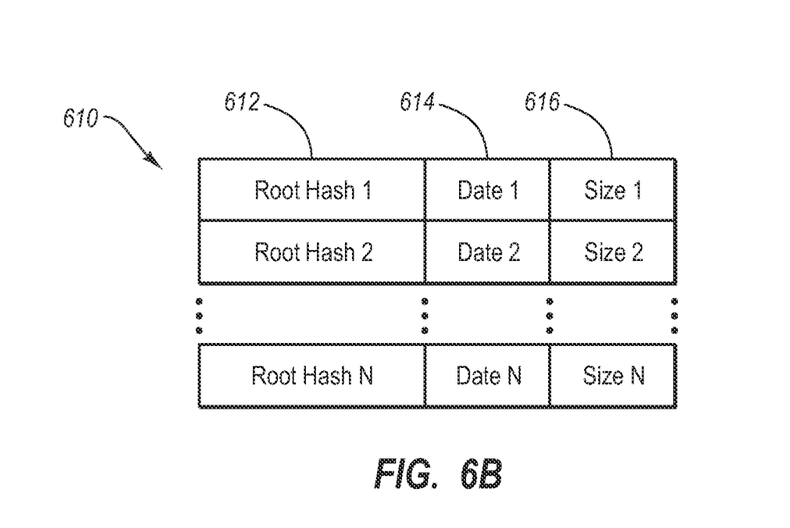

In one embodiment illustrated in FIG. 6B, the root tag vector 610 is an array identifying a plurality of root hashes (1 to N) corresponding to previous backups 158. The root tag vector 610 may include a first column 612 containing the root hashes of one or more backups 158 stored in the backup server 150, a second column 614 indicating the date a corresponding backup was performed, and/or a third column 616 indicating the size of bytes represented by the corresponding backup. In one embodiment, the root tag vector 610 identifies up to 16 root hashes corresponding to 16 backups performed by the client in whose cache the root tag vector is stored. However, the number of root hashes identified in the root tag vector can more generally be described as the number of backups typical of a given client.

Figure 6C:
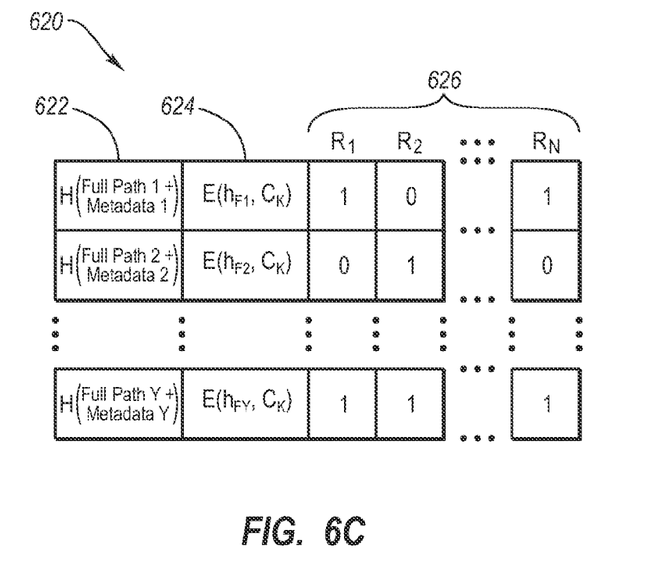

One embodiment of the filename cache 620 is illustrated in FIG. 6C. The filename cache 620 includes a plurality of entries, each entry corresponding to a different file. The first column 622 of the filename cache 620 may be used to store an unencrypted hash value identifying a particular file. In the present embodiment, the unencrypted hash value stored in the column 622 is a hash value of the full path and metadata of the corresponding file, although the hash value could alternately be the hash value of the contents of the corresponding file.

The second column 624 of the filename cache 620 may be used to store an encrypted hash value corresponding to the file and received from the backup server. For instance, the encrypted hash value $E(h_{F1}, C_K)$ for the first entry is an encryption using the client-specific key $C_K$ of the hash value $h_{F1}$ of the contents of file 1. Alternately or additionally, the encrypted hash value may be an encryption using the client-specific key $C_K$ of the hash value from the first column 622.

The filename cache 620 may further include a tag field 626 indicating which backups each file is protected by. More specifically, the tag field 626 for each entry includes 1 to N bits that identify one or more root hashes (e.g., $R_1, R_2, \ldots R_N$) the file is protected by. As already mentioned above, the existence of a root hash implicates the existence of all the data (including files) and composites beneath the root hash somewhere in the CAS system 154. For example, the existence of root hash 1 ($R_1$) implies that the files represented by the hash of file 1 (e.g., H(full path 1+metadata 1)) and the hash of file Y (e.g., H(full path Y+metadata Y)) have previously been entered into the hash file system and stored in the CAS system 154. Thus, when creating a backup, the client 110 could is_present root hash 1 and if the backup server responds in the affirmative, the client 110 would not have to is_present file 1 or file Y if encountered during backup generation.

Figure 6D:
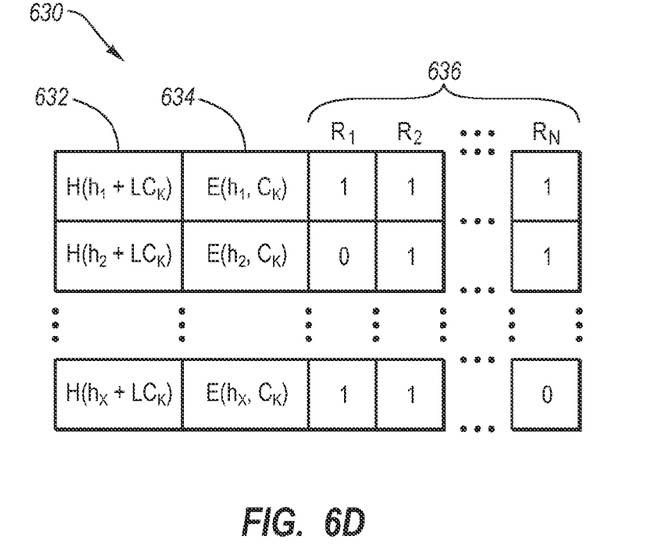

One embodiment of the hash cache 630 is illustrated in FIG. 6D. Similar to the filename cache 620, the hash cache 630 includes a plurality of entries, each entry corresponding to a different chunk of data. The first column 632 of the hash cache 630 may be used to store a hash value identifying a particular chunk of data. In the present embodiment, for instance, the hash value $H(h_1+LC_K)$ stored in the column 632 for the first entry is a hash value of a combination of (1) a hash value $h_1$ of the data chunk with (2) a client-generated unique key $LC_K$. The key $LC_K$ is used for salting the values of the hash cache in a way so that they are not store unencrypted on disk. It is relatively fast to salt the hash and keeps it from being reversible by a potential intruder.

The second column 634 of the hash cache 630 may be used to store an encrypted hash value corresponding to the data chunk and received from the backup server. For instance, the encrypted hash value $E(h_1, C_K)$ for the first entry is an encryption using the client-specific key $C_K$ of the hash value $h_1$ of the data chunk.

Similar to the filename cache 620, the hash cache 630 may further include a tag field 636 indicating which backups each data chunk is protected by.

Various hashing algorithms can be implemented by the storage applications 116, 126, 136 to obtain hash values of files, data chunks, and the like, including SHA1, MD5, and the like or any combination thereof. One skilled in the art, with the benefit of the present disclosure, will appreciate that the use of the SHA1 algorithm generates hash values that are 20 bytes long.

According to one embodiment, the 4 most significant bytes ("MSBs") of a SHA1 hash value are used for hash steering. In this case, the backup server may encrypt only a portion of the hash values when returning encrypted hash values to clients. For instance, the backup server may encrypt 16 bytes of each hash value, not including the 4 MSBs. In this example, the backup server may implement symmetric key block encryption, which is typically done on 8 byte blocks. By dividing a given hash value into one block of the 4 MSBs and two blocks of 8 bytes each, the two 8 byte blocks can easily be encrypted using a conventional symmetric key block encryption algorithm.

The embodiments described herein may include the use of a special purpose or general-purpose computer including various computer hardware or software modules, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired and wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features/acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for protecting backup data from unauthorized access on a backup server that implements a hash file system for storing backup data in content addressed storage, the method comprising:
   receiving, at a backup server, a hash value from a client, the hash value identifying a location of data of the client that is stored in the content addressed storage, wherein the hash value is obtained by hashing at least one of the data itself and other data associated with the data;
   encrypting at least a portion of the hash value using an encryption key that is specific to the client to generate an encrypted hash value, wherein the hash value is used to eliminate redundant data from the backup data and to point to the data stored in the content addressed storage and identified by the hash value, wherein the encrypted hash value protects the data from being accessed by other clients that are not associated with the encryption key that is specific to the client; and
   providing the encrypted hash value to the client, wherein the client stores the encrypted hash value for later use in communicating with the backup server regarding the data of the client identified by the encrypted hash value, wherein the encrypted hash value encrypted with the encryption key specific to the client prevents a second client from accessing the backup data associated with the client, wherein the backup server enables access to the client's data only if the encrypted hash value is successfully decrypted using the decryption key specific to the client, wherein a decryption key specific to the second client fails to successfully decrypt the encrypted hash value which enables the backup server to protect the client's data from unauthorized access by the second client.

2. The method of claim 1, wherein the hash value from the client is a 20-byte SHA1 hash value that includes four most significant bytes for hash steering and sixteen remaining bytes.

3. The method of claim 2, wherein encrypting at least a portion of the hash value includes encrypting the sixteen remaining bytes but not the four most significant bytes.

4. The method of claim 1, further comprising, prior to encrypting at least a portion of the hash value, receiving the data and storing the data in content addressed storage, the hash value being used as the pointer to the data in the content addressed storage.

5. The method of claim 1, wherein the hash value is received from the client in a query from the client to determine whether the data represented by the hash value has previously been backed up to the backup server by the client, the method further comprising, responding to the query prior to encrypting at least a portion of the hash value.

6. The method of claim 1, wherein the backup server stores the data represented by the hash value in content addressed storage in a location identified by the hash value, the method further comprising:
   receiving a request for the data from the client, the request including the encrypted hash value;
   decrypting the encrypted hash value using the encryption key to obtain the hash value identifying the location of the data in content addressed storage; and
   providing the data from the location of the content addressed storage to the client.

7. The method of claim 1, wherein the backup server receives and encrypts hash values from a plurality of clients using a plurality of client-specific encryption keys, such that hash values received from one client are encrypted using one encryption key and hash values received from a different client are encrypted using a different encryption key.

8. The method of claim 7, wherein:
   the backup server backs up the data represented by the hash values received from the plurality of clients by storing the data in content addressed storage in locations identified by the hash values; and
   if the backup server receives, from a requesting client, a request for data that includes an encrypted hash value corresponding to the data and the encrypted hash value was previously encrypted using an encryption key specific to a client other than the requesting client, the backup server:
   does not decrypt the encrypted hash value using the encryption key specific to the client other than the requesting client such that the backup server does not obtain a hash value that identifies a location of the data; and
   does not provide the data to the requesting client since the hash value identifying the location of the data was not obtained.

9. A system for restricting access to backup data in single-instance storage to corresponding backup clients, the system comprising:
   a storage device for storing a single instance of all backup data received from a plurality of backup clients, wherein the backup data received from the backup clients is stored in locations of the storage device that are identified by hash values of the backup data, wherein the hash values are obtained by hashing the backup data such that the backup data can be identified by and accessed by the hash values, wherein each hash value is a pointer to a location of backup data in the storage device; and an encryption and decryption module that includes an encryption key and a decryption key for each backup client, wherein the hash values received from a first backup client are encrypted with the encryption key of the first backup client to generate encrypted hash values, wherein each backup client is associated with a different encryption key, wherein the encrypted hash values encrypted with the encryption key of the first backup client are provided to the first backup client, wherein the first backup clients stores the encrypted hash values for later use in communicating with the system regarding the data pointed to by the encrypted hash values, wherein the hash values are obtained by hashing at least one of the data itself or by hashing other data associated with the data, wherein the encryption and decryption module uses a decryption key associated with the first backup client to access the data of the first backup client such that a second backup client is prevented from accessing the backup data of the first backup client stored in the storage device, wherein the backup server enables access to the data of the first backup client only if the encrypted hash value is successfully decrypted using the decryption key specific to the first backup client, wherein a decryption key specific to the second backup client fails to successfully decrypt the encrypted hash value which enables the backup server to protect the first backup client's data from unauthorized access by the second backup client.

10. The system of claim 9, further comprising a cache for storing a table of hash values representative of backup data stored in the storage device.

11. The system of claim 9, wherein the encryption and decryption module implements an encryption algorithm for encrypting the hash values received from each backup client and wherein the encryption algorithm comprises one or more of a block cipher, a stream cipher, and an asymmetric key algorithm.

12. The system of claim 9, further comprising a key generator module for generating the client-specific encryption keys for encrypting the hash values received from the backup clients, wherein each encryption key corresponds to a different one of the backup clients.

13. The system of claim 12, wherein:
the backup client can request data represented by a hash value by providing the system with a corresponding encrypted hash value previously received from the backup server;
the encryption and decryption module can decrypt the corresponding encrypted hash value with the encryption key specific to the first backup client to obtain the hash value; and
the system can retrieve the data represented by the hash value from a location in the storage device identified in the hash value and then provide the data to the first backup client.

14. A method of backing up data on a backup client to a backup server such that the backup client can only access its own backed up data, the method comprising:
performing, at a backup client, a hash function to generate a hash representative of data stored in the backed up data by a backup server, wherein the hash value is obtained by hashing at least one of the data itself or by hashing other data associated with the data;

providing the hash to a backup server, wherein the backup server backs up the data associated with the hash in a content addressed storage and wherein the hash points to a location of the data in the content addressed storage and enables access to the data in the content addressed storage;

receiving, from the backup server, an encryption of the hash, wherein the encryption of the hash is generated by the backup server encrypting at least a portion of the hash with an encryption key specific to the backup client and only known to the backup server, wherein the backup server uses a decryption key associated with the encryption key and with the backup client to decrypt the encrypted hash when accessing the backup data of the backup client, wherein a second backup client is prevented from accessing the backup data since hash values received from the second backup client for the backup data are decrypted with a different decryption key that is associated with the second backup client, wherein the different decryption key is unable to decrypt the encrypted hash value encrypted with the encryption key specific to the backup client, wherein the backup server enables access to data only if the encrypted hash value is successfully decrypted using the decryption key specific to the backup client, wherein the different decryption key fails to successfully decrypt the encrypted hash value which enables the backup server to protect the first backup client's data from unauthorized access by the second backup client; and storing the encryption of the hash for later use in communicating with the backup server regarding the data.

15. The method of claim 14, wherein the data represented by the hash is stored in content addressed storage in a location pointed to by the hash.

16. The method of claim 15, further comprising, providing the encryption of the hash to the backup server to request the data, wherein the server uses a decryption key specific to the backup client to decrypt the encryption of the hash and obtain the hash, such that the backup server can then retrieve the data for the backup client from the location of the content addressed storage pointed to by the hash.

17. The method of claim 16, wherein the encryption key comprises a symmetric key, and wherein the decryption key and the encryption key are the same key.

18. The method of claim 16, wherein if a different backup client acquires the encryption of the hash from the backup client and provides it to the backup server to request the data, the backup server attempts to decrypt the encryption of the hash using a decryption key specific to the different backup client, which does not obtain the hash pointing to the location of the data in content addressed storage.

19. The method of claim 14, wherein the hash function performed is a SHA1 hash and a size of the hash is 20 bytes long, further wherein the backup server encrypts 16 bytes of the 20-byte hash.

20. The method of claim 14, wherein the hash representative of data comprises one of:
a hash of the contents of a file;
a hash of a full path and metadata of the file;
a hash of a piece of the file; or
a hash of the hash of the piece of the file combined with a client-generated key that is unique to the backup client.

* * * * *